(12) United States Patent
Zhang et al.

(10) Patent No.: US 12,476,474 B2
(45) Date of Patent: Nov. 18, 2025

(54) CHARGING SYSTEM FOR SWAPPING STATION OR ENERGY STORAGE STATION

(71) Applicants: AULTON NEW ENERGY AUTOMOTIVE TECHNOLOGY GROUP, Guangdong (CN); SHANGHAI DIANBA NEW ENERGY TECHNOLOGY CO., LTD., Shanghai (CN)

(72) Inventors: Jianping Zhang, Shanghai (CN); Bing Liu, Shanghai (CN); Zhimin Chen, Shanghai (CN)

(73) Assignees: AULTON NEW ENERGY AUTOMOTIVE TECHNOLOGY GROUP, Guangzhou (CN); SHANGHAI DIANBA NEW ENERGY TECHNOLOGY CO., LTD., Shanghai (CN)

(*) Notice: Subject to any disclaimer, the term of this patent is extended or adjusted under 35 U.S.C. 154(b) by 683 days.

(21) Appl. No.: 17/789,194

(22) PCT Filed: Dec. 28, 2020

(86) PCT No.: PCT/CN2020/140320
§ 371 (c)(1),
(2) Date: Jun. 25, 2022

(87) PCT Pub. No.: WO2021/129878
PCT Pub. Date: Jul. 1, 2021

(65) Prior Publication Data
US 2022/0393491 A1    Dec. 8, 2022

(30) Foreign Application Priority Data
Dec. 26, 2019  (CN) .......................... 201911370518.3

(51) Int. Cl.
*H02J 7/00* (2006.01)
*B60L 53/80* (2019.01)

(52) U.S. Cl.
CPC ............ *H02J 7/0045* (2013.01); *B60L 53/80* (2019.02); *H02J 7/0013* (2013.01); *H02J 7/0049* (2020.01)

(58) Field of Classification Search
CPC ..... H02J 7/0013; H02J 7/0049; H02J 7/00712
(Continued)

(56) References Cited

U.S. PATENT DOCUMENTS

| | | | |
|---|---|---|---|
| 2015/0207316 A1 | 7/2015 | Saussele et al. | |
| 2020/0083733 A1* | 3/2020 | Chang | H02J 7/0048 |

FOREIGN PATENT DOCUMENTS

| | | |
|---|---|---|
| CN | 102255364 A | 11/2011 |
| CN | 205882757 U | 1/2017 |

(Continued)

OTHER PUBLICATIONS

Oct. 15, 2024 Japanese First Office Action issued in Japanese Patent Application No. 2022-539449.
(Continued)

*Primary Examiner* — Julian D Huffman
*Assistant Examiner* — Ryu-Sung P. Weinmann

(57) ABSTRACT

Provided is a charging system for a swapping station or an energy storage station. The charging system comprises at least two charging modules, battery charging ports, and a control module; and the control module is used for calling different numbers of charging modules and/or controlling the output power of each of the charging modules. Different numbers of charging modules are called according to the different charging requirements, and the output power of the charging modules can also be controlled, such that the batteries can be efficiently and quickly charged, electric
(Continued)

energy can be rationally distributed, and the charging efficiency can be improved.

13 Claims, 5 Drawing Sheets

(58) Field of Classification Search
USPC .......................................................... 320/113
See application file for complete search history.

(56) References Cited

FOREIGN PATENT DOCUMENTS

| | | |
|---|---|---|
| CN | 106532850 A | 3/2017 |
| CN | 106816901 A | 6/2017 |
| CN | 108365623 A | 8/2018 |
| CN | 108454451 A | 8/2018 |
| CN | 108879850 A | 11/2018 |
| CN | 109117975 A | 1/2019 |
| CN | 209305379 U | 8/2019 |
| JP | 2011239559 A | 11/2011 |
| JP | 2015525057 A | 8/2015 |
| JP | 2019213424 A | 12/2019 |
| WO | 2018154594 A1 | 8/2018 |

OTHER PUBLICATIONS

Oct. 30, 2024 Israeli First Office Action issued in Israeli Patent Application No. 294282.
Jan. 4, 2024 Extended European Search Report issued in European Patent Application No. 20905190.3.
Mar. 29, 2021 International Search Report issued in International Patent Application No. PCT/CN2020/140320.
Mar. 29, 2021 Written Opinion of the International Searching Authority issued in International Patent Application No. PCT/CN2020/140320.
Jun. 28, 2022 International Preliminary Report on Patentability issued in International Patent Application No. PCT/CN2020/140320.

* cited by examiner

CHARGING SYSTEM FOR SWAPPING STATION OR ENERGY STORAGE STATION

The present application is a National Stage of International Application No. PCT/CN2020/140320, filed on Dec. 28, 2020, which claims priority of the Chinese Patent Application No. CN201911370518.3, filed on Dec. 26, 2019, the contents of which are incorporated herein by reference in their entireties.

TECHNICAL FIELD

The present disclosure relates to the field of new energy vehicles, and in particular to a charging system for a battery swapping station or an energy storage station.

BACKGROUND

As new energy transport, the electric vehicle features low noise, high energy utilization efficiency, zero exhaust emission and the like, and it has become one of the emerging industries which have witnessed rapid development in recent years.

Energy supply is an important link in the industrial chain of electric vehicles, and the energy supply mode is closely related to the development of the electric vehicles. An electric vehicle is powered by a battery, and it is necessary to charge the battery at intervals to replenish the electric energy. At present, most of the electric vehicles in China are charged by a public power grid, and when batteries are being charged, one charger corresponds to one quick-swap battery, and one charger provides electric energy for a battery corresponding to the charger in terms of the serial number. Under this one-to-one charging mode, in one aspect, when a certain battery is fully charged, the corresponding charger stops working, and meanwhile, the battery urgently needed to be charged cannot be timely replenished; in another aspect, when a certain charger fails, the corresponding charging bin is not available, or the system still charges the battery through the faulty charger.

The utility model patent with the Authorized Announcement No. CN209305379U discloses a split type battery swapping station, which comprises a charging device as a whole, wherein the charging device comprises a power distribution port, a power control module and different types of charging terminals, and the charging terminals such as a battery pack is charged with the distribution of output power controlled by the power control module. In this way, although the flexibility of power distribution is improved to a certain extent, the essence of the method is still that the charging terminals such as a battery pack are charged in a one-to-one manner based on the original total charging power, and when a certain charger fails, the battery corresponding to the charger cannot be supplied with electric energy.

Content of the Present Invention

The technical problem that the present disclosure aims to solve is the defect that each charger charges the battery corresponding to the charger in terms of the serial number in a unidirectional way in the prior art, and the present disclosure provides a charging system for a battery swapping station or an energy storage station that can adjust the number and output power of charging modules and corresponding quick-swap batteries according to the state of the battery or the charging modules.

The present disclosure solves the technical problem described above through the following technical scheme.

The present disclosure provides a charging system for a battery swapping station or an energy storage station, wherein the charging system comprises at least two charging modules, a battery charging port and a control module, and the at least two charging modules are connected in parallel;

the control module is used to deploy different numbers of the charging modules and/or control output power of each of the charging modules and charge a quick-swap battery through the battery charging port.

In the present disclosure, different numbers of charging modules are deployed according to the different charging demands of batteries, and the output power of the charging module can also be controlled according to the different charging demands of batteries, which not only enables efficient and rapid charging particularly for batteries with high charging demand, but also distributes the electric energy rationally, such that the charging efficiency is improved, and the demand of a user to swap the battery in time is satisfied and thereby the user experience of swapping battery in the battery swapping station is promoted.

Preferably, the control module is used to deploy different numbers of the charging modules and control the output power of each of the charging modules according to a charging demand of the quick-swap battery, and charge the quick-swap battery through the battery charging port so as to meet the charging demand.

The control module can deploy different numbers of the charging modules and control the output power of each of the charging modules according to current electric quantity of the quick-swap battery being charged and/or a current state of each of the charging modules.

In the present disclosure, corresponding numbers of the charging modules are flexibly deployed and the output power of the charging modules is controlled according to the charging demand of the quick-swap battery, so that the service efficiency of each of the charging modules is improved to the greatest extent.

In the present disclosure, the electric energy can be distributed to the battery that needs to charge most, which strengthens the flexibility of charging, also solves the defect of low efficiency of one-to-one, fixed charging mode in the prior art, and thus further improves charging efficiency.

Preferably, each of the charging modules has a first output interface, the first output interfaces of the at least two charging modules are connected in parallel through a current divider or a contactor, and the control module deploys different numbers of the charging modules by controlling the current divider or the contactor.

Each of the charging modules has a first input interface, and the first input interfaces of the at least two charging modules can also be connected in parallel by sharing a bus so as to be supplied with power by an external power source in a centralized manner.

In the present disclosure, by connecting the output interfaces of the charging modules in parallel, not only can the charging modules be controlled to provide electric energy for the battery according to the demand of the battery, but also a plurality of charging modules can be utilized to particularly supply power to a to-be-charged battery so as to maximize the utilization efficiency of the charging modules.

Preferably, the control module is further used to disconnect electric connection between the charging module and the battery charging port and instruct the deployed charging module to stop outputting after charging of the quick-swap battery is completed.

In the present disclosure, after charging is completed, by controlling the electric connection to be disconnected and stopping the electric energy output, ineffective electric energy output is avoided, the electric energy is saved, the charging efficiency is improved, the reliability of the whole circuit is also improved, and the safety of the charging system is ensured.

Preferably, the charging system further comprises a monitoring module, a calculating module and a centralized regulation and control module;

the monitoring module is used to monitor a current battery parameter of each of the quick-swap batteries in the station;

the calculating module is used to obtain a charging demand of each of the quick-swap batteries in the current station according to the current battery parameter;

the centralized regulation and control module is used to instruct the control module to deploy different numbers of the charging modules for the battery charging port corresponding to each of the quick-swap batteries and adjust the output power of each of the deployed charging modules according to the charging demand of each of the quick-swap batteries, so that each of the battery charging ports outputs output power suitable for charging each of the quick-swap batteries.

The station represents the battery swapping station.

In present disclosure, according to the monitored parameters of each quick-swap battery, different charging demands are calculated for each battery, and the number of the charging modules, the corresponding output power and its corresponding power supply battery are further controlled, so that not only is the original one-to-one charging mode of the battery swapping station is changed, but also the electric energy of the whole battery swapping station is reasonably distributed, and the charging efficiency of the whole battery swapping station is improved.

Preferably, the charging system further comprises an alternating current (AC) energy supply module or a direct current (DC) energy supply module;

the AC energy supply module comprises an alternating current/direct current (AC/DC) converter, an input end of the AC/DC converter is connected to a power grid, an output end of the AC/DC converter is connected to the charging modules, and the AC/DC converter is used to convert alternating current output by the power grid into direct current and adjust voltage of the direct current;

the DC energy supply module comprises a power generation device and a unidirectional direct current/direct current (DC/DC) converter, an input end of the unidirectional DC/DC converter is connected to the power generation device, an output end of the unidirectional DC/DC converter is connected to the charging modules, and the unidirectional DC/DC converter is used to adjust voltage of direct current output by the power generation device; or, the DC energy supply module comprises the power generation device, the unidirectional DC/DC converter, an energy storage device and a bidirectional DC/DC converter, the input end of the unidirectional DC/DC converter is connected to the power generation device, the output end of the unidirectional DC/DC converter is connected to the energy storage device and the charging modules, one end of the bidirectional DC/DC converter is connected to the energy storage device, the other end of the bidirectional DC/DC converter is connected to the power generation device and the charging modules; the unidirectional DC/DC converter is used to adjust voltage of direct current output by the power generation device; the bidirectional DC/DC converter is used to adjust voltage of direct current output by the unidirectional DC/DC converter or the bidirectional DC/DC converter is used to adjust voltage of direct current output by the energy storage device.

In the present disclosure, various energy utilization modes are provided. Public alternating current can be utilized by directly connecting to a power grid, and direct current provided by an energy storage device or a power generation device can also be utilized, such that the availability and applicability of the charging system is increased.

In the present disclosure, through the optimized configuration of the storage device, not only can the substantial balance between the local energy production and the energy consumption load be realized to meet the charging demands of new energy vehicles, but also the organic combination of environmental protection, energy utilization and the like is realized to the maximum extent through the use of the power generation devices driven by clean energy such as photovoltaic energy and wind power.

Preferably, the charging system further comprises an AC energy supply module and an energy storage and supply module, wherein the AC energy supply module comprises a bidirectional AC/DC converter, and the energy storage and supply module comprises an energy storage device and a bidirectional DC/DC converter;

an alternating current end of the bidirectional AC/DC converter is connected to a power grid, a direct current end of the bidirectional AC/DC converter is connected to the charging modules and one end of the bidirectional DC/DC converter, the one end of the bidirectional DC/DC converter is also connected to the charging modules, and the other end of the bidirectional DC/DC converter is connected to the energy storage device;

the bidirectional AC/DC converter is used to convert alternating current output by the power grid into direct current and adjust voltage of the direct current; or the bidirectional AC/DC converter is used to convert direct current output by the charging modules and/or direct current output by the bidirectional DC/DC converter into alternating current and adjust voltage of the alternating current;

the bidirectional DC/DC converter is used to adjust voltage of direct current output by the energy storage device; or the bidirectional DC/DC converter is used to adjust voltage of direct current output by the bidirectional AC/DC converter.

In the present disclosure, through the bidirectional AC/DC converter, the alternating current directly output by the power grid can be converted into the direct current, the direct current output by the charging modules and the power generation device can also be converted into the alternating current, and further the effective voltage of the converted alternating current or direct current can be adjusted.

Preferably, the monitoring module is further used to monitor a current state of the power grid;

when the current state of the power grid is a power consumption valley, the centralized regulation and control module is further used to instruct the control module to control the charging modules to only receive electric energy output by the power grid and increase output power of the output port, or meanwhile instruct the energy storage device to receive electric energy output by the power grid;

when the current state of the power grid is a power consumption peak, the centralized regulation and control module is further used to instruct the control module to control the power grid to stop outputting electric energy to the charging modules, and control the energy storage device to output electric energy to the charging modules; or, the centralized regulation and control module is further used to, when the current state of the power grid is the power consumption peak and the number of the quick-swap batteries that have completed charging currently reaches a threshold of full-charge batteries, instruct the control module to control the power grid to stop outputting electric energy to the charging modules, and meanwhile control the energy storage device and a first number of the quick-swap batteries to output electric energy to the power grid.

In the present disclosure, the charging mode can be adjusted by monitoring the states of the power grid at different periods such as the power consumption valley and the power consumption peak and also taking in account of the charging demand of the quick-swap battery, so that the superfluous electric energy during the valley period of power consumption can be digested, and the power transmission pressure of the power grid can also be reduced during the peak period of power consumption.

Preferably, the charging system further comprises a DC energy supply module;

the DC energy supply module comprises the power generation device and the unidirectional DC/DC converter, the input end of the unidirectional DC/DC converter is connected to the power generation device, and the output end of the unidirectional DC/DC converter is connected to the charging modules, one end of the bidirectional DC/DC converter and a direct current end of the bidirectional AC/DC converter;

the unidirectional DC/DC converter is used to adjust the voltage of the direct current output by the power generation device;

the bidirectional DC/DC converter is further used to adjust the voltage of the direct current output by the unidirectional DC/DC converter;

the bidirectional AC/DC converter is further used to convert the direct current output by the unidirectional DC/DC converter into alternating current and adjust the voltage of the alternating current.

In the present disclosure, by connecting the unidirectional DC/DC converter and the bidirectional DC/DC converter in the DC energy supply module, and connecting the unidirectional DC/DC converter and the bidirectional AC/DC converter, not only can the voltage of direct current output by the power generation device be further adjusted, but also the electric energy with voltage adjusted can be further supplied to the energy storage device for storage and standby, and the direct current output by the power generation device can be converted into alternating current for reverse transmission by the power grid, thereby further reducing the pressure of the power grid during the peak period of power consumption.

Preferably, the monitoring module is further used to monitor a current state of the power grid;

when the current state of the power grid is a power consumption valley, the centralized regulation and control module is further used to instruct the control module to control the charging modules to only receive electric energy output by the power grid, control the power generation device to only output electric energy to the energy storage device, and increase output power of the output port, or meanwhile instruct the energy storage device to further receive electric energy output by the power grid;

when the current state of the power grid is a power consumption peak, the centralized regulation and control module is further used to instruct the control module to control the power grid to stop outputting electric energy to the charging modules, and control the energy storage device and/or the power generation device to output electric energy to the charging modules and/or the power grid; and/or, the centralized regulation and control module is further used to, when the number of the quick-swap batteries that have completed charging currently reaches a threshold of full-charge batteries, instruct the control module to control the power grid to stop outputting electric energy to the charging modules and meanwhile control the energy storage device, the power generation device and a first number of the quick-swap batteries to output electric energy to the power grid.

In the present disclosure, by monitoring the different periods of the power grid such as power consumption valley and power consumption peak and the number of full-charge batteries, the direction of electric energy output by the energy storage device and the power generation device can be flexibly controlled, which can not only utilize the green energy to the utmost extent, but also help with peak adjustment and valley filling of the power grid.

Preferably, the at least two charging modules are conventional charging modules; the charging system further comprises at least one redundant charging module, wherein the redundant charging module is connected to the conventional charging modules in parallel and is connected to each of the battery charging ports separately through switches.

In the present disclosure, through setting up the redundant charging module and the corresponding switches, the control module can be allowed to deploy the redundant charging module for charging the quick-swap batteries through controlling the connect of the switches. In one aspect, when the conventional module corresponding to the quick-swap battery fails, the normal charging of the quick-swap battery can be ensured; in another aspect, the charging efficiency of the quick-swap battery can be improved through the cooperation of the redundant charging module and the conventional charging module.

Preferably, the control module is used to deploy the conventional charging module in a conventional charging mode and charge the quick-swap battery through the battery charging port;

the control module is further used to deploy the redundant charging module in a special charging mode and charge the quick-swap battery through the battery charging port.

In the present disclosure, through the setting up and the deploying of the redundant battery, the charging demand of quick-swap batteries can be met and the charging efficiency of quick-swap batteries can be improved as well, which further promotes the user experience of swapping battery in the battery swapping station or the energy storage station.

Preferably, the special charging mode includes the case that one of the conventional charging modules fails and the control module is used to connect one of the switches to deploy the redundant charging module for charging the quick-swap battery corresponding to the faulty conventional charging module through the battery charging port; and/or, the special charging mode includes the case that the control module receives an accelerated charging instruction and the control module is used to deploy the redundant charging module and at least one of the conventional charging modules for charging the quick-swap battery that needs accelerated charging together through the battery charging port.

In the present disclosure, when the conventional charging module cannot meet the charging demand of the quick-swap battery because the charging rate of the quick-swap battery needs to be increased, the control module can deploy the redundant charging module to charge the quick-swap battery together with the conventional charging module so as to accelerate the charging speed and improve the charging efficiency; and when the conventional charging module fails, the redundant charging module is deployed, so that the quick-swap battery corresponding to the faulty conventional charging module can be directly charged by the redundant charging module without waiting for the other conventional charging modules to charge the quick-swap battery corresponding to the faulty conventional charging module after charging the current quick-swap battery.

The positive effects of the present disclosure are as follows: the charging system for a battery swapping station or an energy storage station provided in the present disclosure can deploy different numbers of charging modules according to the different charging demands of batteries, and also can control the output power of the charging module according to the different charging demands of batteries, which not only enables efficient and rapid charging particularly for batteries with high charging demands, but also distributes the electric energy rationally, improves the charging efficiency and help with peak adjustment and valley filling of the power grid.

DETAILED DESCRIPTION OF THE PREFERRED EMBODIMENT

The present disclosure is further illustrated by the following embodiments; however, the present disclosure is not limited thereto.

Embodiment 1

Figure 1:
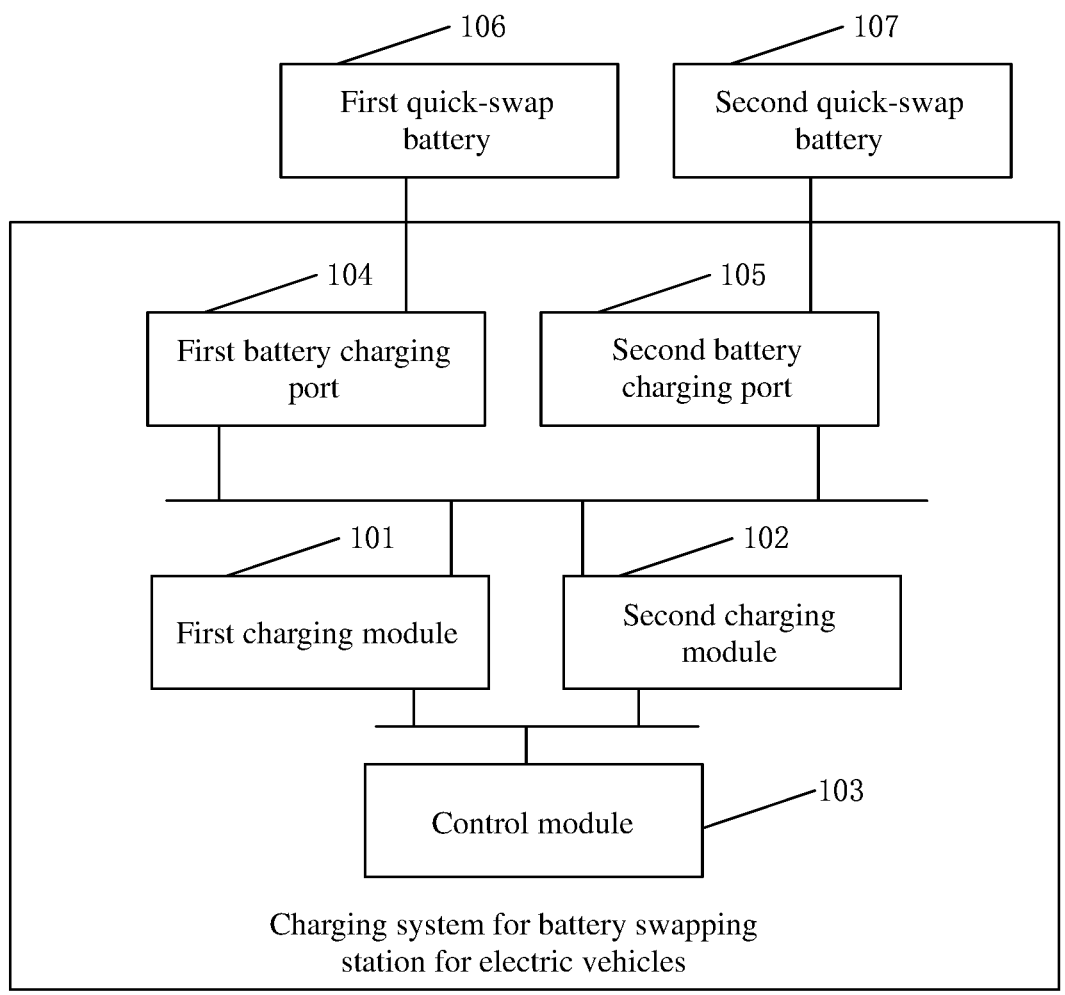
FIG. 1 is a schematic diagram of modules of a charging system for a battery swapping station or an energy storage station in Embodiment 1 of the present disclosure.

A charging system for a battery swapping station or an energy storage station is provided in this embodiment. As shown in FIG. 1, the charging system comprises a first charging module 101, a second charging module 102, a first battery charging port 104, a second battery charging port 105 and a control module 103.

The first charging module 101 and the second charging module 102 are connected in parallel.

The control module 103 is used to deploy different numbers of charging modules and/or control output power of each charging module, and charge the first quick-swap battery 106 and the second quick-swap battery 107 through the first battery charging port 104 and the second battery charging port 105.

It should be understood that the two charging modules are illustrated in this embodiment by way of example only, and should not be construed as limiting. In actual practice, the number of the charging modules needs to be customized according to models, requirements, structures and practicability of different battery swapping stations, and the output power of each charging module needs to be dynamically regulated and controlled. For example, if the power supply demand for the battery swapping station or the energy storage station is relatively low, 1 to 5 single charging modules of 40 kw may be set to form a smallest conventional distributed charging system.

The charging system for a battery swapping station or an energy storage station provided in this embodiment can deploy different numbers of charging modules according to the different charging demands of batteries, and also can control the output power of the charging module according to the different charging demands of batteries, which not only enables efficient and rapid charging particularly for batteries with high charging demands, but also distributes the electric energy rationally, such that the charging efficiency is improved, and the demand of a user to swap the battery in time is satisfied and thereby the user experience of swapping battery in the battery swapping station or the energy storage station is promoted.

Embodiment 2

Figure 2:
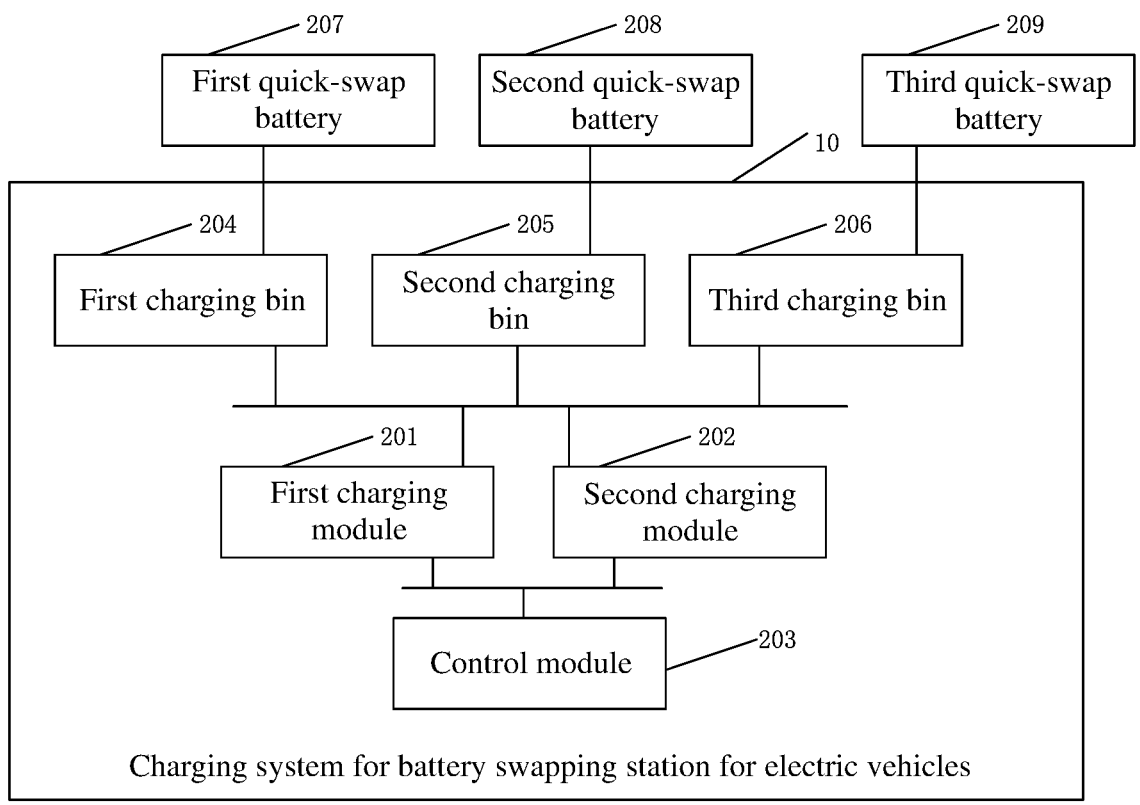
FIG. 2 is a schematic diagram of modules of a charging system for a battery swapping station or an energy storage station in Embodiment 2 of the present disclosure.

A charging system for a battery swapping station or an energy storage station is provided in this embodiment. As shown in FIG. 2, the charging system comprises a control module 203, a first charging module 201, a second charging module 202, a first charging bin 204, a second charging bin 205 and a third charging bin 206, wherein each charging bin corresponds to a battery charging port, and the control module 203 is used to deploy different numbers of charging modules and/or control output power of each charging module and charge a first quick-swap battery 207, a second quick-swap battery 208 and a third quick-swap battery 209 through the battery charging ports.

The number of batteries that need to be allocated with corresponding power of electric energy, the number of charging modules that perform this allocating and the number of batteries corresponding to each charging module or the number of charging modules corresponding to a battery all need to be regulated and controlled dynamically according to actual needs.

In order to flexibly and dynamically distribute electric energy with appropriate power to the quick-swap batteries, each charging module has a first output interface, the first output interfaces of the first charging module 201 and the second charging module 202 are connected in parallel through a current divider or a contactor, and the control module 203 deploys different numbers of charging modules by controlling the current divider or the contactor. In addition, each charging module has a first input interface, and the first input interfaces of the first charging module 201 and the second charging module 202 can also be connected in parallel by sharing a bus so as to be supplied with power by an external power source together.

The control module 203 can also deploy different numbers of charging modules and control the output power of each charging module according to the charging demand of each quick-swap battery and charge the quick-swap batteries through the battery charging ports, so as to meet the charging demand of each quick-swap battery. Assume that two charging modules both have output power of 40 kw. If the control module 203 receives required charging power of 60 kw from a quick-swap battery, the control module 203 needs to deploy the two charging modules for charging the battery at the same time, and adjust the output power of each of the two charging modules to be 30 kw, or adjust the output power of one charging module to be 40 kw and that of the other to be 20 kw.

In order to make the charging system in this embodiment safer and more reliable, the control module 203 can further disconnect the electric connection between the charging modules and the charging ports of the quick-swap batteries and instruct the deployed charging modules to stop outputting after the charging of the quick-swap battery is completed.

It should be understood that two charging modules, three charging bins comprising corresponding battery charging ports and three quick-swap batteries for corresponding charging are illustrated in this embodiment by way of example only and should not be construed as limiting. In actual practice, the number of charging modules and the number of charging devices comprising a battery charging port need to be customized according to the models and requirements of different battery swapping stations or energy storage stations.

For better understanding of this embodiment, a specific example will be provided below to explain this embodiment.

Assume that the charging system in practice comprises two charging modules, i.e., the first charging module 201 and the second charging module 202, and the charging system needs to charge two quick-swap batteries, i.e., the first quick-swap battery 207 and the second quick-swap battery 208. At present, a large number of charging stations (or energy storage stations) or battery swapping stations (or energy storage stations) in the market use one-to-one wiring to supply power to charging modules (charging posts), and the output terminal is also in a one-to-one manner. In this way, the charging module can only correspond to the first quick-swap battery 207 and charge it, and the use efficiency is relatively low. However, in this embodiment, charging units matching different modules and power can be designed in the battery swapping station according to customer demands, layout of the battery swapping station, power supply ability and the like. For example, if the power supply ability of the battery swapping station is small, the battery swapping amount is 300-400 batteries every day and the charging demand is not particularly high, a charging module with the power of 30 kw can be selected, two charging modules form a smallest distributed charging unit, the input of the two charging modules is alternating current supplied in a mode that two charging modules are connected in parallel by sharing one bus, and the output of the two charging modules each firstly goes to corresponding charging base modules connected in parallel through a current divider (or a contactor). The smallest distributed unit thus formed can have the following four different output properties:

1. The first charging module 201 and the second charging module 202 charge the corresponding first quick-swap battery 207 and the second quick-swap battery 208, respectively.

2. The first charging module 201 and the second charging module 202 all charge the first quick-swap battery 207. If the current state of the second quick-swap battery 208 is fully charged and the second charging module 202 is in an idle standby state, while the first quick-swap battery 207 has low charge but is in urgent need of charging, the control module 203 can control the first charging module 201 and the second charging module 202 to simultaneously charge the first quick-swap battery 207.

3. The first charging module 201 and the second charging module 202 all charge the second quick-swap battery 208. If the current state of the first quick-swap battery 207 is fully charged and the first charging module 202 is in an idle standby state, while the second quick-swap battery 208 has low battery power but is in urgent need of charging, the control module can control the first charging module 201 and the second charging module 202 to simultaneously charge the second quick-swap battery 208.

4. Since the first charging module 201 (or the second charging module 202) fails, the control module 203 can control the charging module that does not fail to charge the first quick-swap battery 207 and the second quick-swap battery 208 separately in sequence.

According to the mode described above, various layouts of distributed unit can be realized to form a charging network meeting the demand.

It should be understood that if the battery swapping amount of the battery swapping station is large and the charging demand is high, a charging module with higher power may be selected, and accordingly, more charging modules can be provided for each charging unit, and more charging units can also be provided in the entire charging system for the battery swapping station or the energy storage station to meet the charging demand.

The charging system for the battery swapping station or the energy storage station in this embodiment can meet corresponding demands by customizing according to the models and requirements of different battery swapping stations or energy storage stations, and the charging system can utilize the characteristic of centralized charging to allow the idle charging modules to particularly charge the quick-swap battery in urgent need of charging, so as to maximize the utilization efficiency of the charging modules.

This embodiment improves the reliability of the charging system for a battery swapping station or an energy storage station. In a distributed battery swapping station or energy storage station, by realizing modularized centralized management of the charging system in a single charging mode through the concept of integration of the charging module control microprocessors and sharing of the quasi-battery data in each charging unit, the charging power can be freely allocated in a certain range, the substantive problem that the charging and the customer operation are influenced by faults that occur when the distributed single charging module charges a single corresponding battery is completely avoided in the charging process, and thus reliable and stable operation is achieved.

The charging system in this embodiment is in standardized, modularized, integrated, serialized and customized design, and the concept of everything is connected is applied to all the controllers in the charging system, such that each charging module is able to communicated and realize data transmission. When certain charging modules need to be added or removed, the newly added charging units can be conveniently and quickly connected into or removed from the charging system network, and the operation of other charging units will not be affected.

In this embodiment, different numbers of charging modules are deployed according to the different charging demands of batteries, and the output power of the charging module can also be controlled according to the different charging demands of batteries, which not only enables efficient and rapid charging particularly for batteries with high charging demand, but also distributes the electric energy rationally, such that the charging efficiency is improved, and the demand of a user to swap the battery in time is satisfied and thereby the user experience of swapping battery in the battery swapping station is promoted.

In this embodiment, not only can the electric energy be distributed to the battery that needs to charge most, but also the condition that a faulty charging module is still charging a to-be-charged battery is avoided, which strengthens the flexibility of charging, also solves the defect of low efficiency of one-to-one, fixed charging mode in the prior art, and thus further improves charging efficiency.

In this embodiment, after charging is completed, by controlling the electric connection to be disconnected and stopping the electric energy output, ineffective electric energy output is avoided, the electric energy is saved, the charging efficiency is improved, the reliability of the whole circuit is also improved, and the safety of the charging system is ensured.

Embodiment 3

Figure 3:
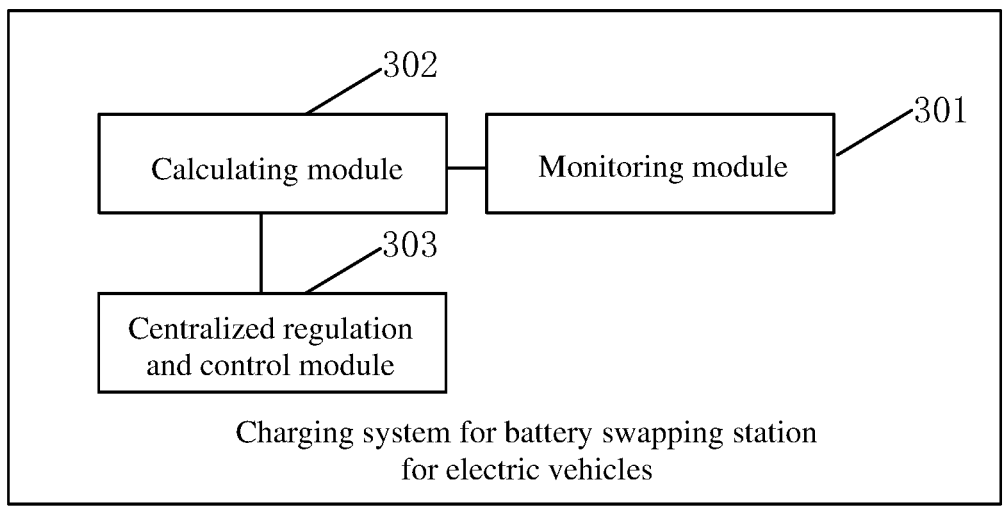
FIG. 3 is a schematic diagram of some modules of a charging system for a battery swapping station or an energy storage station in Embodiment 3 of the present disclosure.

A charging system for a battery swapping station or an energy storage station is provided in this embodiment, and this embodiment is a further improved version of Embodiment 2. As shown in FIG. 3, the charging system of this embodiment further comprises a monitoring module 301, a calculating module 302 and a centralized regulation and control module 303.

The monitoring module 301 is used to monitor a current battery parameter of each quick-swap battery in the battery swapping station or the energy storage station.

The calculating module 302 is used to obtain a charging demand of each quick-swap battery in the current battery swapping station or the current energy storage station according to the current battery parameter.

The centralized regulation and control module 303 is used to instruct the control module 203 to deploy different numbers of charging modules for the battery charging port corresponding to each quick-swap battery and adjust the output power of each deployed charging module according to the charging demand of each quick-swap battery, so that each battery charging port outputs the output power suitable for charging each quick-swap battery.

The monitoring module 301 can monitor the current battery parameter of each quick-swap battery through a battery management system (BMS).

For better understanding of this embodiment, a specific example will be provided below to explain this embodiment: if the monitoring module 301 monitors that the charging demands of all the to-be-charged batteries are not high under the condition that the current electric energy output is limited but the number of the to-be-charged batteries is large, the current electric energy can be calculated by the calculating module 302 so as to be evenly distributed to each to-be-charged battery, and the centralized regulation and control module 303 can allow the charging demand of each battery to be lowered by the way of controlling the power of each battery to be lowered and increasing the charging time of each battery; and if the monitoring module 301 monitors that some batteries with high charging demand are present in the to-be-charged batteries, e.g., a certain battery needs to be used an hour later, the calculating module 302 can calculate the corresponding power output to the battery with high charging demand in a centralized manner, and the centralized regulation and control module 303 first allows the battery with high charging demand to be charged particularly by way of increasing the output power, and then allow other batteries to be charged after the battery is fully charged.

In this embodiment, according to the monitored parameters of each quick-swap battery, different charging demands are calculated for each battery, and the number of the charging modules, the corresponding output power and its corresponding power supply battery are further controlled, so that not only is the original one-to-one charging mode of the battery swapping station is changed, but also the electric energy of the whole battery swapping station is reasonably distributed, and the charging efficiency of the whole battery swapping station is improved.

Embodiment 4

Figure 4:
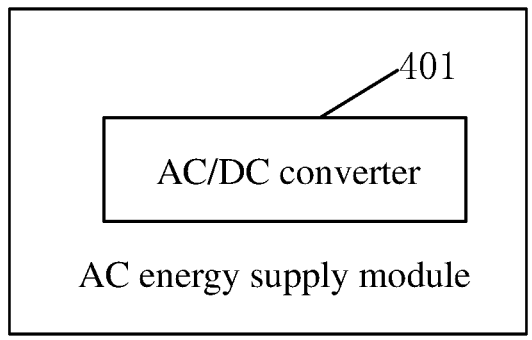
FIG. 4 is a schematic diagram of an AC energy supply module of a charging system for a battery swapping station or an energy storage station in Embodiment 4 of the present disclosure.
Figure 5:
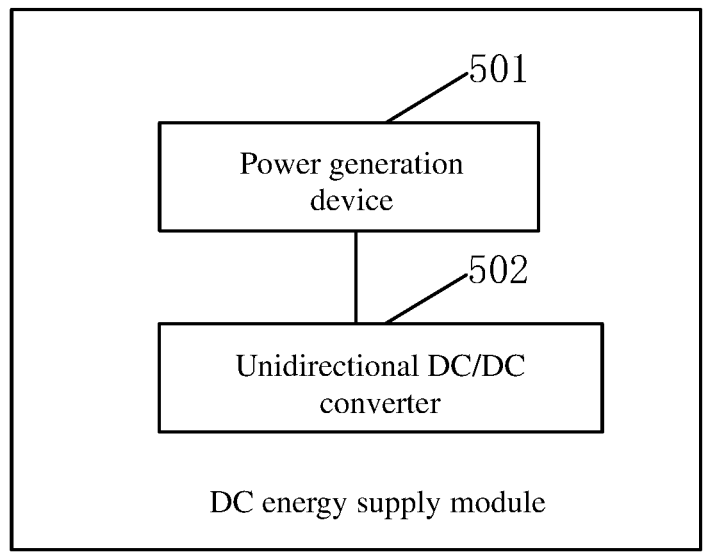
FIG. 5 is a schematic diagram of a DC energy supply module of a charging system for a battery swapping station or an energy storage station in Embodiment 4 of the present disclosure.

A charging system for a battery swapping station or an energy storage station is provided in this embodiment, and this embodiment is a further improved version of Embodiment 2 or Embodiment 3. The charging system in this embodiment further comprises an energy supply module, and the energy supply module in this embodiment may comprise only an alternating current (AC) energy supply module as shown in FIG. 4, may also comprise only a direct current (DC) energy supply module as shown in FIG. 5, and may also comprise both the AC energy supply module as shown in FIG. 4 and the DC energy supply module as shown in FIG. 5.

The AC energy supply module comprises an AC/DC converter 401. An input end of the AC/DC converter 401 is connected to a power grid, an output end of the AC/DC converter is connected to the charging modules, and the AC/DC converter is used to convert alternating current output by the power grid into direct current and adjust voltage of the direct current.

The DC energy supply module comprises a power generation device 501 and a unidirectional DC/DC converter 502. An input end of the unidirectional DC/DC converter 502 is connected to the power generation device 501, and an output end of the unidirectional DC/DC converter 502 is connected to the charging modules, and the unidirectional DC/DC converter 502 is used to adjust the voltage of the direct current output by the power generation device 501.

The power generation device includes clean energy power generation devices, such as a photovoltaic power generation system and a wind power generation system.

In this embodiment, various energy utilization modes are provided. Public alternating current can be utilized by directly connecting to a power grid, and direct current provided by a power generation device can also be utilized, such that the availability and applicability of the charging system is increased.

Embodiment 5

Figure 6:
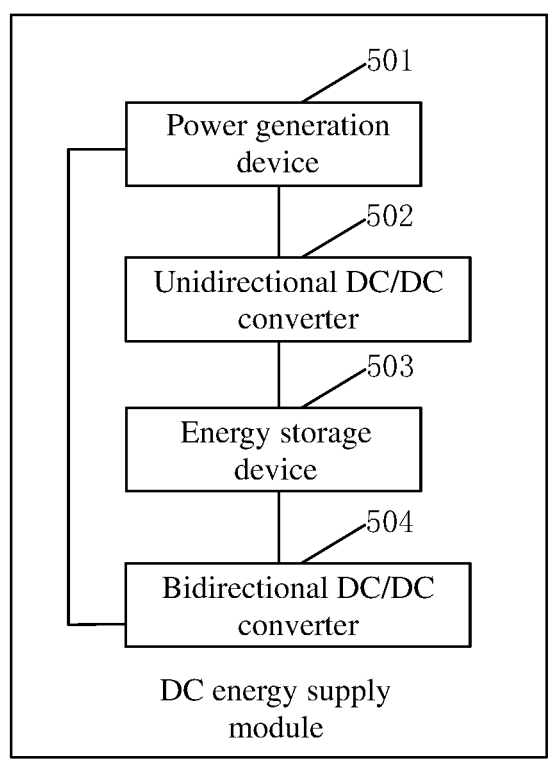
FIG. 6 is a schematic diagram of a DC energy supply module of a charging system for a battery swapping station or an energy storage station in Embodiment 5 of the present disclosure.

This embodiment provides a charging system for a battery swapping station or an energy storage station and is substantially the same as Embodiment 4, except that, as shown in FIG. 6, the DC energy supply module in the this embodiment further comprises an energy storage device 503 and a bidirectional DC/DC converter 504, the input end of the unidirectional DC/DC converter 502 is connected to the power generation device 501, the output end of the unidirectional DC/DC converter 502 is connected to the energy storage device 503 and the charging modules, one end of the bidirectional DC/DC converter 504 is connected to the energy storage device 503, the other end of the bidirectional DC/DC converter 504 is connected to the power generation device 501 and the charging modules, the unidirectional DC/DC converter 502 is used to adjust the voltage of the direct current output by the power generation device 501, the bidirectional DC/DC converter 504 is used to adjust a voltage of direct current output by the unidirectional DC/DC converter 502, or, the bidirectional DC/DC converter 504 is used to adjust a voltage of direct current output by the energy storage device 503.

In this embodiment, various energy utilization modes are provided. Public alternating current can be utilized by directly connecting to a power grid, and direct current provided by an energy storage device or a power generation device can also be utilized, such that the availability and applicability of the charging system is increased.

In this embodiment, through the optimized configuration of the energy storage device, not only can the substantial balance between the local energy production and the energy consumption load be realized to meet the charging demands of new energy vehicles, but also the organic combination of environmental protection, energy utilization and the like is realized to the maximum extent through the use of the power generation devices driven by clean energy such as photovoltaic energy and wind power.

Embodiment 6

This embodiment provides a charging system for a battery swapping station or an energy storage station, and is substantially the same as Embodiment 5, except that the AC/DC converter 401 in Embodiment 5 is specifically a bidirectional AC/DC converter, and in addition, the charging system in this embodiment only comprises an energy storage device 503 and a bidirectional DC/DC converter 504, and the energy storage device 503 and the bidirectional DC/DC converter 504 jointly form an energy storage and supply module.

An alternating current end of the bidirectional AC/DC converter is connected to a power grid, a direct current end of the bidirectional AC/DC converter is connected to the charging modules and one end of the bidirectional DC/DC converter 504, one end of the bidirectional DC/DC converter 504 is also connected to the charging modules, and the other end of the bidirectional DC/DC converter 504 is connected to the energy storage device 503.

The bidirectional AC/DC converter is used to convert alternating current output by the power grid into direct current and adjust voltage of the direct current; or the bidirectional AC/DC converter is used to convert direct current output by the charging module and/or direct current output by the bidirectional DC/DC converter 504 into alternating current and adjust voltage of the alternating current.

The bidirectional DC/DC converter 504 is used to adjust voltage of direct current output by the energy storage device; or the bidirectional DC/DC converter is used to adjust voltage of direct current output by the bidirectional AC/DC converter.

In this embodiment, through the bidirectional AC/DC converter, not only can the alternating current output by the power grid be converted into direct current for charging the quick-swap batteries or the energy storage device, but also the direct current output by the charging modules and the power generation device into alternating current for reversely outputting to the power grid in return for peak cutting and valley filling.

In the present disclosure, through the optimized configuration of the energy storage device, not only can the substantial balance between the local energy production and the energy consumption load be realized to meet the charging demands of new energy vehicles, but also the organic combination of environmental protection, energy utilization and the like is realized to the maximum extent through the use of the power generation devices driven by clean energy such as photovoltaic energy and wind power.

Embodiment 7

This embodiment provides a charging system for a battery swapping station or an energy storage station, and is an improved version of Embodiment 5 or Embodiment 6, and the monitoring module 301 in this embodiment is further used to monitor a current state of the power grid.

When the current state of the power grid is a power consumption valley, the centralized regulation and control module 303 is further used to instruct the control module 203 to control the charging modules to only receive the electric energy output by the power grid and increase output power of the output ports, or meanwhile instruct the energy storage device to receive the electric energy output by the power grid;

when the current state of the power grid is a power consumption peak, the centralized regulation and control module 303 is further used to instruct the control module 203 to control the power grid to stop outputting electric energy to the charging modules, and control the energy storage device 503 to output electric energy to the charging modules; or, the centralized regulation and control module is further used to, when the current state of the power grid is the power consumption peak and the number of quick-swap batteries that have completed charging currently reaches a threshold of full-charge batteries, instruct the control module 203 to control the power grid to stop outputting electric energy to the charging modules, and meanwhile control the energy storage device 503 and a first number of quick-swap batteries to output electric energy to the power grid.

The monitoring module 301 can monitor current power grid parameters by connecting to a power grid monitoring system and monitor station-end current parameters of the battery swapping station through a control area network (CAN) bus, and in addition, the monitoring module 301 can also obtain big data of all battery swapping stations from an external cloud end for optimizing the current battery swapping station.

The current state of the power grid includes different periods such as power consumption peak and power consumption valley, and because the power consumption costs in different periods are different, this embodiment can, through monitoring of the different periods, control the utilization of electric energy to save cost and improve utilization efficiency of electric energy.

The monitoring module 301 can also be connected to the Internet to realize real-time sharing of big data with a cloud platform of the battery swapping station by using the Internet, and an individualized implementable scheme for station-end power charging and battery swapping control at the battery swapping station or the energy storage station is calculated by the calculating module 302, so that output of multiple items of information such as working states, modes and alarms of the power charging modules in the station is managed in a centralized manner.

In this embodiment, real-time data of each battery monitored can be acquired in real time through the CAN bus, and the acquired data and current power consumption period of this station, the station-end battery swapping demand of the current station, etc., are gathered together, such that the charging modules are controlled, through the control module, to output suitable electric energy to corresponding batteries.

For better understanding of this embodiment, a specific example will be provided below to further explain this embodiment.

Assume that the current battery swapping station comprises 3 charging units and each charging unit 3 comprises 5 charging modules. If the battery swapping station is in the morning peak period of battery swapping at this time, such as 7:00-9:00, the power grid is also in the power consumption peak period, and most batteries in the battery swapping station are fully charged and normal low-power charging is enough to meet the demand for battery swapping, after an electric vehicle comes to the battery swapping station and swaps the battery, when the swapped low-charge battery is charged, the centralized regulation and control module will instruct to stop obtaining electric energy from the power grid and to obtain electric energy only through the energy storage device and/or the power generation device, and meanwhile the module can be controlled to charge the battery with the minimum power; when the power consumption of the power grid is changed to the flat period after the early peak, the centralized regulation and control module can timely adjust the power of the charging module according to the current electric quantity and the demand of the batteries in the battery swapping station to charge the batteries, and if the electric quantity of a specific battery is in low charge and idle charging modules are available, other idle charging modules of the same charging unit can be used to increase the charging power for the battery to complete charging as soon as possible, and certainly, the increased charging power is suitable for charging the battery. The power grid is also in the peak period of power consumption, and it is possible that the centralized regulation and control module will stop charging the quick-swap batteries in the battery swapping station, and meanwhile instruct a certain number of full-charge quick-swap batteries, the energy storage device and/or the power generation device to transmit power to the power grid, and recover the charging of the quick-swap batteries after the power consumption peak.

On the contrary, the demand for battery changing is low during the valley period of power consumption at night and the time period is long, the batteries can be deeply charged by low current to carry out balance maintenance of individual batteries, and the superfluous electric energy can be used to charge the energy storage device. In this way and by taking advantage of the "tip, peak, flat and valley" periods of the power grid to reduce the expense, i.e., the power supply pressure of the power grid is reduced, and the superfluous electric energy in the valley period of power consumption is digested.

In this embodiment, through modularized management of the charging modules by using the monitoring module, the calculating module and the centralized regulation and control module, and through real-time monitoring of the power grid load pressure, the safety state of charging modules, the health degree of batteries, current temperature, equipment running state, current operating pressure and other aspects, the electric energy can be automatically and rationally distributed to each battery, which not only improves the service ability and the operating efficiency of the battery swapping station or energy storage station, but also reduces the operation cost of the battery swapping station or energy storage station and the work intensity of the staff there, and improving the service quality and the operating efficiency of the battery swapping station or energy storage station increases customer's income.

In this embodiment, by means of the distributed charging network layout of the charging system for the battery swapping station or the energy storage station, in one aspect, the maintenance cost can be greatly reduced due to the lowing of failure rate of equipment, and in another aspect, the original constant-current charging method is changed by the charging mode featuring adjustable charging power, and the charging power and current are intelligently adjusted timely according to the battery charging demand, the power grid load and the operating pressure, such that energy is efficiently and reasonably allocated and thus the charging efficiency is improved and the efficient operation is achieved.

In this embodiment, different current parameters can be set to realize corresponding demands by customizing according to the models and requirements of different battery swapping stations, and the utilization efficiency of the charging modules in the same charging unit can be maximized by taking advantage of the characteristic of centralized charging to the utmost.

Embodiment 8

This embodiment provides a charging system for a battery swapping station or an energy storage station, and is an improved version of Embodiment 5.

The AC/DC converter in this embodiment is a bidirectional AC/DC converter.

In this embodiment, the input end of the unidirectional DC/DC converter is connected to the power generation device 501, and the output end of the unidirectional DC/DC converter 502 is connected to the charging modules, one end of the bidirectional DC/DC converter 504 and the direct current end of the bidirectional AC/DC converter;

the unidirectional DC/DC converter 502 is used to adjust the voltage of the direct current output from the power generation device 501.

The bidirectional DC/DC converter 504 is further used to adjust the voltage of the direct current output by the unidirectional DC/DC converter 504.

The bidirectional AC/DC converter is further used to convert the direct current output by the unidirectional DC/DC converter 502 into alternating current and adjust the voltage of the alternating current.

In this embodiment, the monitoring module 301 is further used to monitor a current state of the power grid.

When the current state of the power grid is a power consumption valley, the centralized regulation and control module 303 is further used to instruct the control module 203 to control the charging modules to only receive electric energy output by the power grid, control the power generation device 501 to only output electric energy to the energy storage device 503, and increase output power of the output ports, or meanwhile instruct the energy storage device 503 to further receive electric energy output by the power grid;

when the current state of the power grid is a power consumption peak, the centralized regulation and control module 303 is further used to instruct the control module 203 to control the power grid to stop outputting electric energy to the charging modules, and control the energy storage device 503 and/or the power generation device 501 to output electric energy to the charging modules and/or the power grid; and/or, the centralized regulation and control module 303 is further used to, when the number of quick-swap batteries that have completed charging currently reaches a threshold of full-charge batteries, instruct the control module to control the power grid to stop outputting electric energy to the charging modules, and meanwhile control the energy storage device 503, the power generation device 501 and a first number of quick-swap batteries to output electric energy to the power grid.

In this embodiment, by connecting the unidirectional DC/DC converter and the bidirectional DC/DC converter in the DC energy supply module, and connecting the unidirectional DC/DC converter and the bidirectional AC/DC converter, not only can the voltage of direct current output by the power generation device be further adjusted, but also the electric energy with voltage adjusted can be further supplied to the energy storage device for storage and standby, and the direct current output by the power generation device can be converted into alternating current for reversely outputting to the power grid, thereby further reducing the pressure of the power grid during the peak period of power consumption.

In this embodiment, by monitoring the different periods of the power grid such as power consumption valley and power consumption peak and the number of full-charge batteries to control the direction of electric energy output by the energy storage device and the power generation device, not only can the electric energy be automatically and rationally distributed to each battery and the battery with high charging demand be particularly efficiently and rapidly charged, but also superfluous electric energy can be stored for standby and be output reversely to the power grid to help with peak adjustment and valley filling of the power grid.

Embodiment 9

This embodiment provides a charging system and is a further improved version of any one of Embodiments 1 to 8. In this embodiment, the first charging module, the second charging module and the other charging modules of the charging system are all conventional charging modules, and the control module is specifically used to deploy the conventional charging modules in a conventional charging mode and charge the quick-swap batteries through the battery charging ports.

The charging system of this embodiment further comprises at least one redundant charging module, which is used as a backup power supply for charging the quick-swap batteries, wherein the redundant charging module is connected in parallel with the conventional charging modules, and is connected to each of the battery charging ports separately through switches.

In the conventional charging mode, the control module does not need to deploy the redundant charging module for charging the quick-swap batteries. In a specific embodiment, the control module can control the switch between the redundant charging module and the corresponding battery charging port to be disconnected in the conventional charging mode, so that the quick-swap batteries are charged only by using the conventional charging modules. In the special charging mode, the control module deploys the redundant charging module for charging the corresponding quick-swap battery through the corresponding battery charging port so as to meet the charging demand of the quick-swap battery. In a specific embodiment, the control module is used to control the switch between the redundant charging module and the corresponding battery charging port to be connected in a special charging mode so as to enable the connection between the redundant charging module and the battery charging port to deploy the redundant charging module.

In the conventional charging mode, the conventional charging modules can meet the charging demand of the quick-swap batteries, while in the special charging mode, when the conventional charging modules cannot meet the charging demand of the quick-swap batteries because the charging rate of the quick-swap battery needs to be increased or the conventional charging module that originally charges the quick-swap batteries fails, the control module can deploy the redundant battery for charging the quick-swap batteries.

The specific implementation mode of the redundant charging module can be selected according to actual demands, and in this embodiment, the redundant charging module is set to be the same as other charging modules in order to improve the stability of the whole charging system.

In this embodiment, through the setting up and the deploying of the redundant battery, the charging demand of quick-swap batteries can be met and the charging efficiency of quick-swap batteries can be improved as well, which further promotes the user experience of swapping battery in the battery swapping station or the energy storage station.

In a specific embodiment, the initial charging mode is the normal charging mode, and correspondingly, the initial state of the switch between the redundant charging module and the corresponding battery charging port is a disconnect state, and when in the special charging mode, the control module is used to control the switch between the redundant charging module and the corresponding battery charging port to be connected to turn on the circuit, so as to deploy the redundant charging module and charge the quick-swap battery through the corresponding battery charging port.

In this embodiment, a plurality of redundant charging modules can be set up, and under a specific scenario, each redundant charging module can be further set to be connected to a certain number of conventional charging modules in parallel. For example, in a specific case, three redundant charging modules and eight conventional charging modules are set up, the first redundant charging module can be set to be connected to the first three conventional charging modules in parallel, the second redundant charging module can be set to be connected to the middle two conventional charging modules in parallel, the third redundant charging module can be set to be connected to the last three conventional charging modules in parallel, and the control module can control the switching switch on the circuit from the corresponding redundant charging module to a target battery charging port to be disconnected, such that the circuit is controlled to be turned on or turned off to deploy or prohibit the corresponding redundant charging module for charging the corresponding quick-swap battery. Under a second specific scenario, all the redundant charging modules can be further set to be connected to the conventional charging modules in parallel, and in this mode, the control module can simultaneously control and deploy a plurality of redundant charging modules for charging one or more quick-swap batteries together. In one aspect, the charging speed of the quick-swap batteries can be further accelerated, and in another aspect, the smooth charging process of the to-be-charged quick-swap batteries can be further ensured when a certain redundant charging module fails. It should be understood that the above specific examples are for exemplary illustration only, and in practical applications, the specific number of the redundant charging modules, the specific number of the conventional charging modules, and the corresponding relationship between the redundant charging modules and the conventional charging modules can be set according to actual needs.

Figure 7:
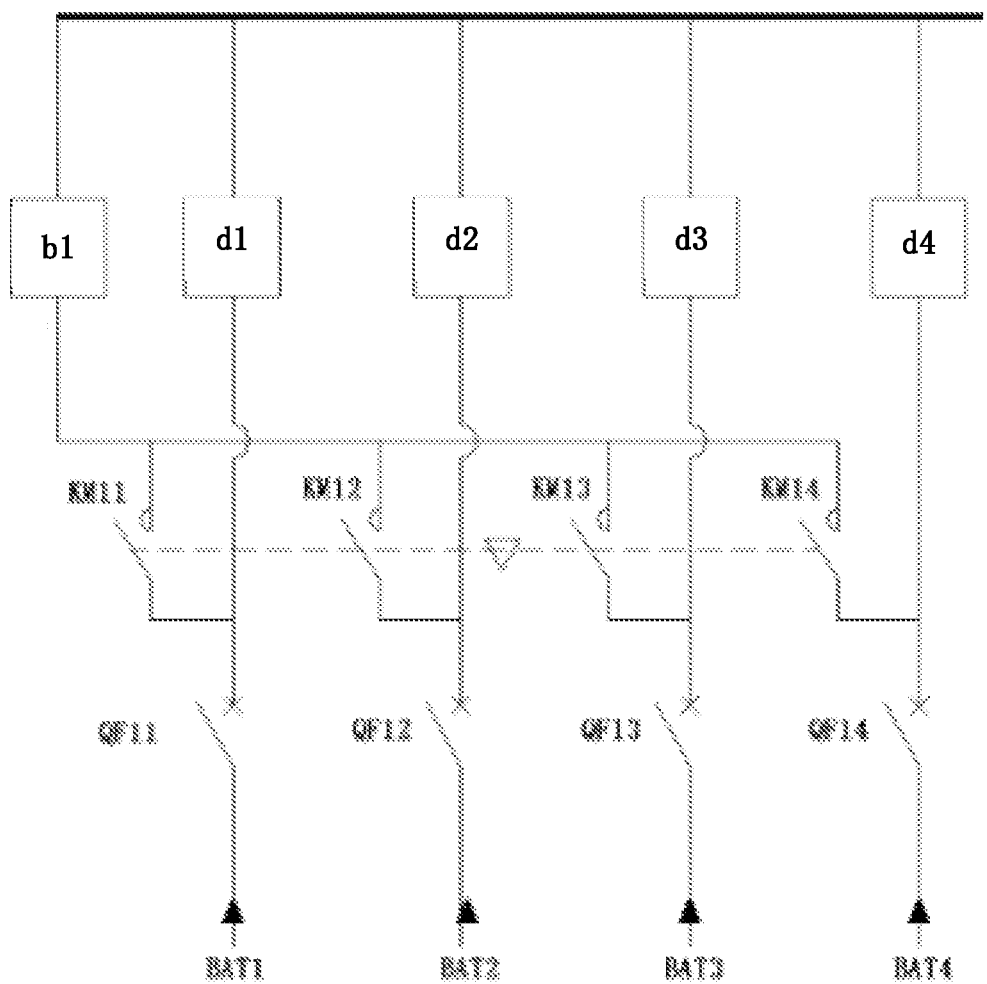
FIG. 7 is a schematic diagram of a circuit structure of a charging system for a battery swapping station or an energy storage station in Embodiment 9 of the present disclosure.

FIG. 7 shows a circuit structure diagram of the charging system in this embodiment under a specific scenario, wherein the charging system comprises a redundant charging module b1 and four conventional charging modules d1, d2, d3 and d4, the redundant charging module b1 is connected to the conventional charging modules d1, d2, d3 and d4 in parallel, and the conventional charging modules d1, d2, d3 and d4 are used to provide electric energy to quick-swap batteries BAT1, BAT2, BAT3 and BAT4 through charging ports corresponding to the quick-swap batteries BAT1, BAT2, BAT3 and BAT4, respectively, in the conventional charging mode.

Switching switches KM11, KM12, KM13 and KM14 are provided on circuits from the redundant charging module to the charging ports corresponding to the quick-swap batteries BAT1, BAT2, BAT3 and BAT4, respectively, wherein the switching switches may be generally set as contactors, or may be other types of mechanical or electronic switches for switching. The specific implementation form of the switching switch is not limited in this embodiment and can be selected according to actual conditions.

The initial states of the switches KM11, KM12, KM13 and KM14 are all a disconnect state, and when a certain quick-swap battery needs to use the redundant charging module, the switch on the corresponding circuit is controlled to be connected so that the redundant charging module can charge the corresponding quick-swap battery, and the specific control flow is as follows:

In a special charging mode, when a certain charging module fails, for example, when the normal charging module d1 fails, the control module controls the switch KM11 originally in the disconnect state to be connected, and the circuit from the redundant charging module b1 to the normal charging module d1 is turned on, so that the redundant charging module b1 can charge the quick-swap battery BAT1 through the battery charging port corresponding to the quick-swap battery BAT1.

In another special charging mode, the redundant charging module and the conventional charging module corresponding to a quick-swap battery can charge the quick-swap battery together, for example, when a certain quick-swap battery has the demand for accelerated charging, or a conventional charging module corresponding to a certain quick-swap battery cannot meet the charging demand of the quick-swap battery. Specifically, for example, when the control module receives an accelerated charging instruction that the quick-swap battery needs accelerated charging, the control module controls the switch KM13 originally in the disconnect state to be connected, and the circuit from the redundant charging module b1 to the conventional charging module d3 is turned on, so that the redundant charging module b1 and the conventional charging module d3 can charge the quick-swap battery BAT3 together through the battery charging port corresponding to the quick-swap battery BAT3.

In this embodiment, through setting up the switching switches on the circuits from the redundant charging module to the quick-swap batteries, the control module can be allowed to deploy the redundant charging module for charging the quick-swap batteries through controlling the connect of the switching switches. In one aspect, when the conventional module corresponding to the quick-swap battery fails, the normal charging of the quick-swap battery can be ensured; in another aspect, the charging efficiency of the quick-swap battery can be improved through the cooperation of the redundant charging module and the conventional charging module.

In this embodiment, switching switches QF11, QF12, QF13 and QF14 can also be provided on circuits from the conventional charging modules to the charging ports corresponding to the quick-swap batteries BAT1, BAT2, BAT3 and BAT4, respectively. When the charging port has no quick-swap battery that needs to be charged or the corresponding quick-swap battery is fully charged, the control module can control the corresponding switch to be disconnected, so as to prevent the conventional charging module from outputting ineffective electric energy. For example, when the quick-swap battery BAT1 is fully charged or reaches a certain preset charging charge value, the charging system generates a QF11 switch disconnection instruction, and when receiving the instruction, the control module controls the switching switch QF11 to be disconnected.

In this embodiment, by setting up the switching switch on the circuit from the conventional charging module to the charging port corresponding to the quick-swap battery, when the charging port has no quick-swap battery to be charged or the corresponding quick-swap battery is fully charged or reaches a preset charging charge value, the corresponding witching switch can be controlled to be disconnected to prevent the charging system from outputting ineffective electric energy, which further improves the electric energy utilization efficiency of the charging system.

It should be understood that the above specific scenario is only for exemplary illustration only, and in practice, the number of the conventional charging modules and the number of a plurality of redundant charging modules may be selected according to actual needs, and the conventional charging modules and the quick-swap batteries may not be in a one-to-one correspondence relationship, for example, a plurality of conventional charging modules can correspond to the same quick-swap battery according to actual charging demand.

Although specific embodiments of the present disclosure have been described above, it will be understood by those skilled in the art that these embodiments are merely illustrative and that the protection scope of the present disclosure is defined by the appended claims. Various changes or modifications can be made to these embodiments by those skilled in the art without departing from the principle and spirit of the present disclosure, and these changes and modifications shall fall within the protection scope of the present disclosure.

What is claimed is:

1. A charging system for a battery swapping station or an energy storage station, comprising at least two charging modules, a battery charging port and a control module, wherein the at least two charging modules are connected in parallel;
the control module is configured to deploy different numbers of the charging modules and/or control output power of each of the charging modules and charge a quick-swap battery through the battery charging port; the charging system further comprising a DC energy supply module;
the DC energy supply module comprises a power generation device and a unidirectional DC/DC converter, an input end of the unidirectional DC/DC converter is connected to the power generation device, an output end of the unidirectional DC/DC converter is connected to the charging modules, and the unidirectional DC/DC converter is configured to adjust voltage of direct current output by the power generation device; or, the DC energy supply module comprises the power generation device, the unidirectional DC/DC converter, an energy storage device and a bidirectional DC/DC converter, the input end of the unidirectional DC/DC converter is connected to the power generation device, the output end of the unidirectional DC/DC converter is connected to the energy storage device and the charging modules, one end of the bidirectional DC/DC converter is connected to the energy storage device, the other end of the bidirectional DC/DC converter is connected to the power generation device and the charging modules; the unidirectional DC/DC converter is configured to adjust voltage of direct current output by the power generation device; the bidirectional DC/DC converter is configured to adjust voltage of direct current output by the unidirectional DC/DC converter or the bidirectional DC/DC converter is configured to adjust voltage of direct current output by the energy storage device.

2. The charging system according to claim 1, wherein the control module is configured to deploy different numbers of the charging modules and control the output power of each of the charging modules according to a charging demand of the quick-swap battery, and charge the quick-swap battery through the battery charging port so as to meet the charging demand.

3. The charging system according to claim 2, wherein each of the charging modules has a first output interface, the first output interfaces of the at least two charging modules are connected in parallel through a current divider or a contactor, and the control module deploys different numbers of the charging modules by controlling the current divider or the contactor.

4. The charging system according to claim 2, wherein the control module is further configured to disconnect electric connection between the charging module and the battery charging port and instruct the deployed charging module to stop outputting after charging of the quick-swap battery is completed.

5. The charging system according to claim 4, further comprising a monitoring module, a calculating module and a centralized regulation and control module, wherein,
the monitoring module is configured to monitor a current battery parameter of each of the quick-swap batteries in the station;
the calculating module is configured to obtain a charging demand of each of the quick-swap batteries in the current station according to the current battery parameter;
the centralized regulation and control module is configured to instruct the control module to deploy different numbers of the charging modules for the battery charging port corresponding to each of the quick-swap batteries and adjust the output power of each of the deployed charging modules according to the charging demand of each of the quick-swap batteries, so that each of the battery charging ports outputs output power suitable for charging each of the quick-swap batteries.

6. The charging system according to claim 5, further comprising an AC energy supply module, wherein,
the AC energy supply module comprises an AC/DC converter, an input end of the AC/DC converter is connected to a power grid, an output end of the AC/DC converter is connected to the charging modules, and the AC/DC converter is configured to convert alternating current output by the power grid into direct current and adjust voltage of the direct current.

7. The charging system according to claim 6, wherein,
the monitoring module is further configured to monitor a current state of the power grid;
when the current state of the power grid is a power consumption valley, the centralized regulation and control module is further configured to instruct the control module to control the charging modules to only receive electric energy output by the power grid and increase output power of the output port, or meanwhile instruct the energy storage device to receive electric energy output by the power grid;
when the current state of the power grid is a power consumption peak, the centralized regulation and control module is further configured to instruct the control module to control the power grid to stop outputting electric energy to the charging modules, and control the energy storage device to output electric energy to the charging modules; or,
the centralized regulation and control module is further configured to, when the current state of the power grid is the power consumption peak and the number of the quick-swap batteries that have completed charging currently reaches a threshold of full-charge batteries, instruct the control module to control the power grid to stop outputting electric energy to the charging modules, and meanwhile control the energy storage device and a first number of the quick-swap batteries to output electric energy to the power grid.

8. The charging system according to claim 5, further comprising an AC energy supply module and an energy storage and supply module, wherein the AC energy supply module comprises a bidirectional AC/DC converter, and the energy storage and supply module comprises an energy storage device and a bidirectional DC/DC converter;
an alternating current end of the bidirectional AC/DC converter is connected to a power grid, a direct current end of the bidirectional AC/DC converter is connected to the charging modules and one end of the bidirectional DC/DC converter, the one end of the bidirectional DC/DC converter is also connected to the charging modules, and the other end of the bidirectional DC/DC converter is connected to the energy storage device;
the bidirectional AC/DC converter is configured to convert alternating current output by the power grid into direct current and adjust voltage of the direct current; or the bidirectional AC/DC converter is configured to convert direct current output by the charging modules and/or direct current output by the bidirectional DC/DC converter into alternating current and adjust voltage of the alternating current;
the bidirectional DC/DC converter is configured to adjust voltage of direct current output by the energy storage device; or the bidirectional DC/DC converter is configured to adjust voltage of direct current output by the bidirectional AC/DC converter.

9. The charging system according to claim 8, further comprising a DC energy supply module, wherein,
the DC energy supply module comprises the power generation device and the unidirectional DC/DC converter, the input end of the unidirectional DC/DC converter is connected to the power generation device, and the output end of the unidirectional DC/DC converter is connected to the charging modules, one end of the bidirectional DC/DC converter and a direct current end of the bidirectional AC/DC converter;

the unidirectional DC/DC converter is configured to adjust the voltage of the direct current output by the power generation device;

the bidirectional DC/DC converter is further configured to adjust the voltage of the direct current output by the unidirectional DC/DC converter;

the bidirectional AC/DC converter is further configured to convert the direct current output by the unidirectional DC/DC converter into alternating current and adjust the voltage of the alternating current.

10. The charging system according to claim 9, wherein, the monitoring module is further configured to monitor a current state of the power grid;

when the current state of the power grid is a power consumption valley, the centralized regulation and control module is further configured to instruct the control module to control the charging modules to only receive electric energy output by the power grid, control the power generation device to only output electric energy to the energy storage device, and increase output power of the output port, or meanwhile instruct the energy storage device to further receive electric energy output by the power grid;

when the current state of the power grid is a power consumption peak, the centralized regulation and control module is further configured to instruct the control module to control the power grid to stop outputting electric energy to the charging modules, and control the energy storage device and/or the power generation device to output electric energy to the charging modules and/or the power grid; and/or, the centralized regulation and control module is further configured to, when the number of the quick-swap batteries that have completed charging currently reaches a threshold of full-charge batteries, instruct the control module to control the power grid to stop outputting electric energy to the charging modules and meanwhile control the energy storage device, the power generation device and a first number of the quick-swap batteries to output electric energy to the power grid.

11. The charging system according to claim 1, wherein the at least two charging modules are conventional charging modules; the charging system further comprises at least one redundant charging module, wherein the redundant charging module is connected to the conventional charging modules in parallel and is connected to each of the battery charging ports separately through switches.

12. The charging system according to claim 11, wherein the control module is configured to deploy the conventional charging module in a conventional charging mode and charge the quick-swap battery through the battery charging port;

the control module is further configured to deploy the redundant charging module in a special charging mode and charge the quick-swap battery through the battery charging port.

13. The charging system according to claim 12, wherein the special charging mode includes the case that one of the conventional charging modules fails and the control module is configured to connect one of the switches to deploy the redundant charging module for charging the quick-swap battery corresponding to the faulty conventional charging module through the battery charging port; and/or, the special charging mode includes the case that the control module receives an accelerated charging instruction and the control module is configured to deploy the redundant charging module and at least one of the conventional charging modules for charging the quick-swap battery that needs accelerated charging together through the battery charging port.

* * * * *